United States Patent
Luo et al.

(10) Patent No.: US 12,129,532 B2
(45) Date of Patent: Oct. 29, 2024

(54) YTTRIUM-ADDED RARE EARTH PERMANENT MAGNET MATERIAL AND PREPARATION METHOD THEREFOR

(71) Applicants: GRIREM ADVANCED MATERIALS CO., LTD., Beijing (CN); GUOKE RE ADVANCED MATERIALS CO., LTD., Langfang (CN)

(72) Inventors: Yang Luo, Beijing (CN); Dunbo Yu, Beijing (CN); Jiajun Xie, Beijing (CN); Caohuan Zhang, Beijing (CN); Ningtao Quan, Beijing (CN); Yuanfei Yang, Beijing (CN); Haijun Peng, Beijing (CN)

(73) Assignees: GRIREM ADVANCED MATERIALS CO., LTD., Beijing (CN); GUOKE RE ADVANCED MATERIALS CO., LTD., Langfang (CN)

(*) Notice: Subject to any disclaimer, the term of this patent is extended or adjusted under 35 U.S.C. 154(b) by 342 days.

(21) Appl. No.: 16/612,290

(22) PCT Filed: Jun. 20, 2018

(86) PCT No.: PCT/CN2018/092021
§ 371 (c)(1),
(2) Date: Nov. 8, 2019

(87) PCT Pub. No.: WO2019/196200
PCT Pub. Date: Oct. 17, 2019

(65) Prior Publication Data
US 2021/0156009 A1    May 27, 2021

(30) Foreign Application Priority Data
Apr. 9, 2018  (CN) .......................... 201810311977.3

(51) Int. Cl.
  *H01F 41/02* (2006.01)
  *B22F 9/04* (2006.01)
  (Continued)

(52) U.S. Cl.
  CPC ............ *C22C 33/0278* (2013.01); *B22F 9/04* (2013.01); *C22C 38/005* (2013.01);
  (Continued)

(58) Field of Classification Search
  None
  See application file for complete search history.

(56) References Cited

U.S. PATENT DOCUMENTS

| | | | |
|---|---|---|---|
| 2004/0154699 A1* | 8/2004 | Chen | H01F 1/0571 148/101 |
| 2015/0248953 A1* | 9/2015 | Suzuki | H02K 21/12 252/62.51 R |
| 2018/0040399 A1* | 2/2018 | Miyazaki | C22C 38/005 |

FOREIGN PATENT DOCUMENTS

| | | |
|---|---|---|
| CN | 101834045 A | 9/2010 |
| CN | 106856118 A | 6/2017 |

(Continued)

OTHER PUBLICATIONS

Chen, Journal of Magnetism and Magnetic Materials. vol. 268, p. 105-113. (Year: 2004).*

(Continued)

*Primary Examiner* — Xiaowei Su
(74) *Attorney, Agent, or Firm* — Westbridge IP LLC

(57) ABSTRACT

The present invention discloses an yttrium-added rare earth permanent magnet material and a preparation method therefor. The chemical formula of the material is expressed as $(Y_x Re_{1-x})_a Fe_{100-a-b-c} M_b B_c$ according to the mass percentage, wherein $0.05 \leq x \leq 0.5$, $20 \leq a \leq 28$, $0.5 \leq b \leq 2$, $0.5 \leq c \leq 1.5$, Re is Nd and/or Pr, and M is Al and/or Nb. According to the (Continued)

present invention, the relatively surplus and inexpensive rare earths yttrium and cerium are used to replace Nd and/or Pr in NdFeB. By controlling the ratio of the rare earth elements such as yttrium, cerium and neodymium, and adding an appropriate amount of Nb and/or Al element, the rare earth elements are used in a comprehensive and balanced manner while better magnetic properties are maintained.

8 Claims, 1 Drawing Sheet

(51) Int. Cl.
*C22C 33/02* (2006.01)
*C22C 38/00* (2006.01)
*B82Y 25/00* (2011.01)
*B82Y 40/00* (2011.01)

(52) U.S. Cl.
CPC .... *H01F 41/0293* (2013.01); *B22F 2009/047* (2013.01); *B22F 2009/048* (2013.01); *B82Y 25/00* (2013.01); *B82Y 40/00* (2013.01); *C22C 2202/02* (2013.01)

(56) References Cited

FOREIGN PATENT DOCUMENTS

| | | |
|---|---|---|
| CN | 106992053 A | 7/2017 |
| JP | 2002285301 A | 10/2002 |
| JP | 2008078614 A | 4/2008 |
| JP | 2011199116 A | 10/2011 |
| JP | 2014107429 A | 6/2014 |

OTHER PUBLICATIONS

International Search Report of PCT/CN2018/092021.
Written Opinion of PCT/CN2018/092021.

* cited by examiner

YTTRIUM-ADDED RARE EARTH PERMANENT MAGNET MATERIAL AND PREPARATION METHOD THEREFOR

CROSS-REFERENCE TO RELATED APPLICATIONS

This application is a national stage application of PCT Application No. PCT/CN2018/092021. This application claims priority from PCT Application No. PCT/CN2018/092021 filed Jun. 20, 2018, and CN 201810311977.3 filed Apr. 9, 2018, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

TECHNICAL FIELD

The present invention belongs to the field of rare earth permanent magnet materials, and particularly relates to an yttrium-added rare earth permanent magnet material and a preparation method therefor.

BACKGROUND

The rare earth permanent magnet material is a magnetic material prepared by mixing rare earth metals samarium and neodymium with a transition metal (such as cobalt and iron) into an alloy, pressing and sintering the alloy by a powder metallurgy method and then performing magnetization by a magnetic field. From the discovery, the NdFeB rare earth permanent magnet material has been widely used in many fields such as electronic products, medical equipment, automobile industry, energy sources and traffic due to the superior comprehensive magnetic properties thereof. With the continuous innovation of technology, the requirement on the heat resistance of magnets is higher and higher. Therefore, the single Nd—Fe—B permanent magnet material no longer meets the market demands. In addition, with the annual increase of the production and consumption of NdFeB, the metal neodymium as a raw material and the commonly used additive metal dysprosium are also consumed faster, resulting in the annual increase in the cost of the materials. Hence, it is urgent to find other rare earth metals that can replace these scarce resources, so that the production cost of the permanent magnet material is reduced while the heat resistance of the NdFeB is improved, thereby meeting the market demands and achieving comprehensive and balanced utilization of the rare earth resources.

On the other hand, with the mining of high-yttrium or medium-yttrium europium-rich rare earth mines in southern China, the high-abundance elements in the rare earth mines of China have large reserves but are relatively low in utilization rate, and the primary products with a low added value are accumulated in large quantities, thereby seriously affecting the comprehensive and balanced utilization of the rare earth resources. Therefore, it is necessary to use these rare earth resources with relatively high abundance to explore new magnetic materials, and to prepare low-cost permanent magnet materials on the basis of optimizing the magnet components and preparation process, so as to reduce the cost of the raw materials.

Since the anisotropy field of $Y_2Fe_{14}B$ is much lower than that of $Nd_2Fe_{14}B$, and the $Y_2Fe_{14}B$ magnet prepared by the traditional method cannot meet the performance requirements, it is urgent to develop a new type of permanent magnet alloy. However, the study also found that $Y_2Fe_{14}B$ has a positive coercive force temperature coefficient in a certain temperature range, and has the Curie temperature slightly higher than that of NdFeB at room temperature, which indicates that yttrium can be used as an additive element to improve the heat resistance of the NdFeB by appropriate processes.

A lot of research has been carried out in such a direction. For example, CN1898757 A discloses a method for preparing a rare earth permanent magnet material. The method comprises the steps of: providing powder containing one or more components selected from an oxide of $R^2$, a fluoride of $R^3$ and an oxyfluoride of $R^4$ on a sintered magnetic molded body of a $R^1$—Fe—B component, wherein $R^1$ is one or more elements selected from rare earth elements containing Y and Sc, and $R^2$, $R^3$ and $R^4$ are one or more elements selected from rare earth elements containing Y and Sc, respectively; and performing heat treatment on the magnetic molded body and the powder in vacuum or in inert gas at a temperature equal to or lower than the sintering temperature of the magnet. Although the invention mentions that the rare earth permanent magnet material may contain yttrium, but does not indicate that yttrium has the effects similar to the rare earth metals such as neodymium and praseodymium and can partially replace these scarce rare earth metals in the NdFeB rare earth permanent magnet material. CN103545079A discloses a double-main-phase yttrium-containing permanent magnet, a chemical formula of which is $(Y_\eta Re_{1-\eta})_\alpha Fe_{100-\alpha-\beta-\gamma}B_\beta TM_\gamma$ according to the mass percentage, wherein $0.05 \leq \eta \leq 0.6$, $29 \leq \alpha \leq 33$, $0.8 \leq \beta \leq 1.4$, $0.5 \leq \gamma \leq 3.6$, Re is one or more of Nd, Pr, Dy, Tb, and Ho elements, and TM is one or more of Ga, Co, Cu, Nb, and Al elements. The double-main-phase yttrium-containing permanent magnet has a double-main-phase structure containing a (Y, Re)—Fe—B main phase and a (Nd, Pr)—Fe—B main phase. The application of Y in the rare earth permanent magnet material is involved, but due to the use of a sintering process in the preparation method, an increase in grain size may be caused, and the production of the material is limited to a certain extent.

In addition, for example, in CN102956336A, for the sintered NdFeB permanent magnet material prepared by partially replacing neodymium or praseodymium and dysprosium rare earth elements with the relatively surplus and inexpensive gadolinium, holmium and yttrium, both the Curie temperature and coercive force are improved, the corrosion resistance is enhanced, and the working temperature, toughness, and the processing performance are also improved. CN105788794 discloses a method for preparing an yttrium-rich permanent magnet. By setting the ratio range of Y, Fe and B, and doping Nd and Mn, the saturation magnetization and coercive force of the permanent magnet material are improved, and further the overall magnetic properties of the permanent magnet material are improved. In CN102360655A, by the composite addition of Y and Gd, the expensive neodymium element is replaced as much as possible while the coercive force of the magnet is ensured, and the manufacturing cost is reduced; and especially due to the composite addition of Y and Gd, the density of the magnet is reduced and the processing performance of the NdFeB material is improved. In CN104064303A, the problem of segregation of the alloy ingot obtained after melting caused by different melting points of respective components and man-made operating factors in the traditional melting process is effectively solved by the introduction of Y and Ga; the addition of Gd is beneficial to improve the thermal stability of the alloy ingot and maintain the magnetic properties of the permanent magnet material unchanged; and Y is added to replace part of Nd and Pr, and only an ordinary electrolytic furnace is needed, thereby reducing the production costs of enterprises. In addition, the occurrence of α-Fe which affects the properties of the permanent magnet material can be effectively avoided. CN101834045A discloses sintered NdFeB and a preparation method therefor, the yttrium-containing sintered NdFeB permanent magnet material is manufactured by using melting, casting, pulverizing, molding and sintering processes, and Nd and Pr are partially replaced with relatively surplus Y, thereby reducing the use amount of Nd and Pr by 3 to 30%. CN102982937A discloses a heat-resistant magnetic material and a preparation method therefor, wherein the NdFeB matrix is neodymium, cobalt, silicon, manganese, boron and the balance iron, and the NdFeB permanent magnet material is added with a dysprosium-iron alloy, a samarium-iron alloy, and an yttrium-iron alloy.

In the prior art including the above technologies, the NdFeB permanent magnet material is modified by doping yttrium from various aspects such as components and preparation processes in order to prepare the rare earth permanent magnet material with the low production cost and better heat resistance. In the above research, yttrium is used as the additive element, the heat resistance of NdFeB is improved by certain processes and the production cost is reduced. However, many processes inevitably use a large amount of heavy rare earths and precious metals. In addition, in the aspect of process selection, the sintering process is adopted frequently, and the grain size and possible a-Fe in the preparation process of the magnet cannot be well controlled.

Therefore, a heretofore unaddressed need exists in the art to address the aforementioned deficiencies and inadequacies.

SUMMARY

To this end, one objective of the present invention is to provide an yttrium-based rare earth permanent magnet material of which the crystal grains of the main phase are more refined, and the heat resistance of the magnet is improved.

For achieving the above objective, the present invention adopts the following technical solution.

Provided is an yttrium-added rare earth permanent magnet material. The chemical formula of the material is expressed as $(Y_xRe_{1-x})_aFe_{100-a-b-c}M_bB_c$ according to the mass percentage, where $0.05 \leq x \leq 0.5$, $20 \leq a \leq 28$, $0.5 \leq b \leq 2$, $0.5 \leq c \leq 1.5$, Re is Nd and/or Pr, and M is Al and/or Nb. x is, for example, 0.07, 0.09, 0.12, 0.15, 0.2, 0.23, 0.27, 0.31, 0.35, 0.4, 0.44, 0.48, and the like; a is, for example, 21, 23, 25, 27 and the like; b is, for example, 0.8, 1.2, 1.4, 1.6, 1.9 and the like; and c is, for example, 0.8, 1.0, 1.2, 1.4, and the like.

In the experiment, x is measured by the atomic percentage of the added Y in the total rare earth content, that is, yttrium is 5% to 50% of the total rare earth content (the total amount of Y and Re). The present invention avoids the use of heavy rare earths, so that the cost is further reduced. Through a lot of experimental research, it is found that M can play roles of quickly refining the crystal grains for a rapidly-quenched thin strip and promoting the formation of an amorphous strip, but the addition of Y can further reduce the grain size on such a basis. Due to the interaction of M and Y, the final grain size is greatly reduced; and the existence of yttrium causes coupling of magnetic properties, which is favorable for property improvement.

The rare earth permanent magnet material provided by the present invention has a lower temperature coefficient and better temperature resistance while better magnetic properties are maintained. The production cost is also greatly reduced due to the use of the relatively-abundant light rare earth element Y instead of Nd and/or Pr.

Preferably, the material has a single 2:14:1 phase structure and the proportion of yttrium in the main phase is 100%.

Preferably, the average grain size of the material is 30 nm-45 nm, and the standard deviation is 4-9 preferably. When this material is compared with the initial NdFeB, of which the average grain size of the crystal phase is 80-120 nm and the standard deviation is 14-20, the crystal grain is remarkably refined, and the morphology distribution is more uniform.

In the present invention, the formation of the single main phase structure can be promoted by adding the appropriate amount of yttrium. Moreover, when the permanent magnet material is compared with the initial NdFeB, of which the average grain size is 80-120 nm, the average crystal grains are greatly refined and more uniformly distributed. Due to the addition of yttrium, the interphase exchange coupling action is also promoted, so that the remanence and magnetic energy product of the magnet are increased.

Preferably, Re is partially replaced with Ce in the material. Through the addition of Ce, the inventors use Ce with 4f electrons per se, which contributes to the anisotropy field, to compensate for the decrease in the magnetic properties due to the addition of the Y element, thereby enhancing the overall magnetic properties of the magnetic powder as a whole.

Preferably, the mass content of Ce in Re is 0-20%, excluding 0, thereby better improving the comprehensive magnetic properties of the magnetic powder.

Preferably, the mass ratio of Y:Ce is 1-2, and is, for example, 1.1, 1.3, 1.5, 1.7, 1.9 and the like. By adding Ce and controlling the addition ratio range of Y and Ce, the inventors can compensate for the decrease in magnetic properties due to the addition of the Y element, which is more favorable for enhancing the comprehensive magnetic properties of the magnetic powder.

Preferably, for the material, yttrium element is introduced into a NdFeB magnet with a nanocrystalline-bonded permanent magnet material preparation process. The corrosion resistance and thermal stability of the magnet have been greatly improved, which provides a reference for solving the problem of the extremely poor heat resistance of the existing magnetic materials. The permanent magnet material according to the present invention has the irreversible magnetic flux loss of less than 2%, preferably less than 1% after being subjected to thermal demagnetization at 120° C. for 100 h through the magnet preparation procedure.

Another objective of the present invention is to provide a method for preparing the yttrium-added rare earth permanent magnet material according to the present invention. The method comprises the following steps: (1) preparing raw material according to the composition of the permanent magnet material according to the present invention, then melting the raw material into an ingot, melting the ingot at a high temperature and then casting the melted ingot onto a rotating roller, and performing rotational rapid quenching cooling to obtain a rapidly quenched thin strip; (2) performing heat treatment on the thin strip obtained in step (1), and then quenching the thin strip and pulverizing the quenched thin strip into alloy powder; and (3) bonding the alloy powder obtained in step (2) with a binder to obtain the permanent magnet material.

In the existing patent CN103545079A, the sintering method is adopted to produce a double-main-phase alloy, and the performance after the addition of yttrium is mainly described. The yttrium is added through the manner more like doping according to the invention, and by adopting the preparation process of the bonded magnet, all the yttrium element enters the main phase, and the modification of the crystal grains (the crystal grains are refined) is mainly carried out. As a result, it is found that the material produced by such a method increases the coupling between soft and hard magnetic phases, and the remanence increase effect is generated.

The rare earths required for preparing the raw material is a single rare earth metals or mixed rare earth metals determined according to a ratio.

Preferably, the melting in step (1) is vacuum melting.

Preferably, the high-temperature melting temperature is 100-300° C., and is, for example, 105° C., 115° C., 130° C., 150° C., 180° C., 210° C., 250° C., 270° C., 290° C., and the like above the melting point of the raw material for preparing the rapidly quenched thin strip. Here, the raw material refers to the rare earth, Fe element and NbFe and BFe alloys that are used in the preparation of the master alloy, and is melted at the temperature of 100-300° C. above the maximum melting point thereof by querying the melting point.

Preferably, the casting is carried out by a high vacuum single-roller rotational quenching method.

Preferably, the rotational quenching roller speed is 15-45 m/s, and is for example, 17 m/s, 20 m/s, 24 m/s, 28 m/s, 33 m/s, 36 m/s, 40 m/s, 44 m/s and the like.

Preferably, the cooling rate of the rotational rapid quenching cooling is $10^5$-$10^{6o}$ C./s, and is, for example, $3*10^5$, $5*10^5$, $7*10^5$, $9*10^5$ and the like. The alloy is subjected to the solidification of a high growth rate (greater than or equal to 1-100 cm/s) under a large supercooling degree.

With different roller speeds in the rapid quenching process, the cooling rates are also different, and the changes of the microstructure, thermodynamics and kinetics in the solidification system are also different. At a low roller speed, α-Fe is precipitated. If the roller speed is too high, the change of the atomic spatial arrangement of the amorphous strip is obvious with the increase of the rotational speed of a cooling roller, which causes the downward trend of Bs and Hc. In the experiment, the alloy melt is rapidly cooled (the cooling rate is $10^5$-$10^6$K/s) by the preferred roller speed or the heterogeneous nucleation phenomenon during the cooling process is suppressed, so that the alloy is subjected to the solidification of a high growth rate (larger than or equal to 1-100 cm/s) under the large supercooling degree, thereby preparing amorphous, quasicrystal and nano alloy materials, and obtaining an amorphous or nanocrystalline metastable rapidly quenched thin strip by rapid solidification.

In one embodiment, the high temperature melting is melting of the raw material at a temperature of 100-300° C. above the melting point of the raw material of the rapidly quenched strip, the rotational quenching roller speed is 15-45 m/s, and in the step of rotational rapid quenching cooling, the cooling rate is $10^5$-$10^{6o}$ C./s.

Preferably, the heat treatment temperature in step (2) is 600-800° C., and is for example, 630° C., 660° C., 700° C., 730° C., 760° C., 790° C., and the like. The heat treatment time is 5-15 min, and is for example, 7 min, 9 min, 11 min, 13 min and the like.

The rapidly quenched thin strip is a disordered material with a large number of amorphous structures and a large number of defects such as dislocations and vacancies. Therefore, in order to improve the magnetic properties of the material, effective heat treatment is required to be performed on the rapidly quenched sample. In order to obtain the nanocrystalline material of a uniform size, the experiment requires a large amount of nucleation of the alloy from a disordered amorphous state in a short time. The thermodynamic experiment shows that the crystallization time is shorter for the nucleation-oriented experiments, and is generally 5-15 min, and the heat treatment temperature of 600-800° C. is favorable for a large amount of nucleation in a short time.

Preferably, the quenching is water-cooling quenching, and the alloy subjected to the heat treatment is immersed in cold water.

Preferably, the quenching time is 30-60 min, and is for example, 35 min, 40 min, 45 min, 50 min, 54 min, 58 min and the like.

The quenching cooling is a key step in the crystallization process, and directly affects the structure and properties of the sample after crystallization. During cooling, the cooling rate should be greater than the critical cooling rate to ensure a stable microstructure of the alloy. The quenching time should be long enough to enable the alloy sample to be water-cooled sufficiently, so as to avoid the regrowth of the grains and the possible oxidation on the surface.

Preferably, the average particle size of the alloy powder is 100 nm-200 nm, and is for example, 110 nm, 125 nm, 140 nm, 150 nm, 160 nm, 173 nm, 180 nm, 190 nm and the like. The rapidly quenched thin strip can be crushed into the alloy powder having an average particle size of 100 nm-200 nm by coarse pulverization and grinding.

Preferably, the binder in step (3) is epoxy resin.

Preferably, the use amount of the binder is 0.5-2 wt % of the alloy powder, and is for example, 0.7 wt %, 0.9 wt %, 1.2 wt %, 1.5 wt %, 1.8 wt %, or the like of the alloy powder.

Preferably, the bonding process comprises: mixing the alloy powder with the solution in which the binder is dissolved, and then volatilizing the solvent to obtain the permanent magnet material. The product obtained after the solvent is volatilized can be further crushed to obtain the permanent magnet powder.

In the above bonding method, the binder epoxy resin is used as a coating layer to coat the surface of the alloy powder (rapidly quenched magnetic powder), thereby not only isolating oxygen to prevent oxidation of the magnet, but also reducing the irreversible magnetic flux loss to some extent and improving the heat resistance to some extent.

Preferably, the organic solvent is one or a combination of two or more of ethanol, toluene, xylene and acetone. The function of the organic solvent is to dissolve the binder epoxy resin, and preferably, the acetone is adopted for better volatilization, high safety and environmental friendliness.

The binder may be epoxy resin binders of different models, such as one or a combination of two or more of E51, E44, and E12, other low-melting point alloy, such as an MnBi binder, which is adopted to change the properties of the magnet, and the metal element such as the Zn binder.

In one embodiment, the bonding process comprises: using epoxy resin as the binder, dissolving the epoxy resin in acetone to prepare an epoxy resin acetone solution, slowly pouring the alloy powder into the epoxy resin acetone solution, performing stirring until the acetone is completely volatilized, and performing crushing to obtain the permanent magnet material.

Preferably, the method comprises the following steps.

(1) Material preparation: the raw material with the component $(Y_xRe_{1-x})_aFe_{100-a-b-c}M_bB_c$ is prepared, wherein $0.05 \le x \le 0.5$, $20 \le a \le 28$, $0.5 \le b \le 2$, $0.5 \le c \le 1.5$, Re is one or more of Nd and Pr elements, M is one or more of Al and Nb, and the content of each of the above elements is a weight content.

(2) Rapid quenching for preparing the strip: the prepared raw material is subjected to vacuum melting to obtain an ingot, the master alloy ingot obtained by melting is subjected to high temperature melting by a high vacuum single-roller rotational quenching method, and then cast onto a rotating roller for rotational rapid quenching cooling to obtain a rapidly quenched thin strip.

The raw material is subjected to high temperature melting at the temperature in the range of 100-300° C. above the melting point of the raw material for preparing the rapidly quenched thin strip, the rotational quenching roller speed is 15-45 m/s, and in the step of rotational rapid quenching cooling, the cooling rate is $10^5$-$10^{6o}$ C./s. The alloy is subjected to the solidification of a high growth rate (1-100 cm/s or above) under a large supercooling degree.

With the different roller speeds in the rapid quenching process, the cooling rates are also different, and the changes of the microstructure, thermodynamics and kinetics in the solidification system are also different. At a low roller speed, α-Fe is precipitated. If the roller speed is too high, the change of the atomic spatial arrangement of the amorphous strip is obvious with the increase of the rotational speed of a cooling roller, which causes the downward trend of Bs and Hc. In the experiment, the alloy melt is rapidly cooled (the cooling rate is $10^5$-$10^6$K/s) by the preferred roller speed or the heterogeneous nucleation phenomenon during the cooling process is suppressed, so that the alloy is subjected to the solidification of a high growth rate (larger than or equal to 1-100 cm/s) under the large supercooling degree, thereby preparing amorphous, quasicrystal and nano alloy materials, and obtaining an amorphous or nanocrystalline metastable rapidly quenched thin strip by rapid solidification.

(3) Heat treatment: the heat treatment temperature is 600-800° C., and the heat treatment time is 5-15 min.

The rapidly quenched thin strip is a disordered material with a large number of amorphous structures and a large number of defects such as dislocations and vacancies. Therefore, in order to improve the magnetic properties of the material, the effective heat treatment is required to be performed on the rapidly quenched sample. In order to obtain the nanocrystalline material of a uniform size, the experiment requires a large amount of nucleation of the alloy from a disordered amorphous state in a short time. The thermodynamic experiment shows that the crystallization time is shorter for the nucleation-oriented experiments, and is generally 5-15 min.

(4) Water-cooling quenching: the quenching process comprises: immersing the alloy subjected to the heat treatment in cold water, wherein the quenching time is 30-60 min.

The cooling is a key step in the crystallization process, and directly affects the structure and properties of the sample after crystallization. During cooling, the cooling rate should be greater than the critical cooling rate to ensure a stable microstructure of the alloy. The quenching time should be long enough to enable the alloy sample to be water-cooled sufficiently, so as to avoid the regrowth of the grains and the possible oxidation on the surface.

The rapidly quenched thin strip is crushed into the alloy powder having an average particle size of 100 nm-200 nm by coarse pulverization and grinding.

(5) Mixed powder preparation: epoxy resin is used as a binder and dissolved in acetone to prepare an epoxy resin acetone solution. The rapidly quenched magnetic powder is slowly poured into the epoxy resin acetone solution and stirred until the acetone is completely volatilized, and crushing is performed to obtain the mixed powder.

The use amount of the epoxy resin in step (5) is 0.5-2 wt % of the rapidly quenched magnetic powder. By the mixed powder prepared in step (5), the epoxy resin is used as a coating layer to coat the surface of the rapidly quenched magnetic powder, thereby not only isolating oxygen to prevent oxidation of the magnet, but also reducing the irreversible magnetic flux loss and improving the heat resistance to some extent.

The present invention provides the yttrium-cerium nanocrystal-bonded magnetic powder and the preparation method therefor. The alloy is melt and then sprayed onto the roller rotating at a high speed by the high vacuum single-roller rotational quenching process, and the alloy melt is rapidly cooled (the cooling speed is $10^5$-$10^6$K/s) or the heterogeneous nucleation phenomenon during the cooling process is controlled, so that the alloy is subjected to the solidification of a high growth rate (greater than or equal to 1-100 cm/s) under the large supercooling degree and thus the rapidly quenched thin strip with fine grains or even an amorphous structure is obtained Subsequently, the thin strip is crushed and subjected to heat treatment and then is prepared into an isotropic bonded magnet by the subsequent steps. The crystal grains can be effectively refined in the experimental preparation process. The prepared magnet has a single 2:14:1 main phase structure, and the obtained permanent magnet has an irreversible magnetic flux loss of less than 2% after being subjected to thermal demagnetization at 120° C. for 100 h. The prepared yttrium-cerium nanocrystalline bonded magnetic powder has the average grain size of 30 nm-45 nm, and the standard deviation of 4-9, the grain growth during the bonding process is effectively avoided, and the high-performance permanent magnet material with the nanocrystalline structure can be obtained.

In the present invention, the relatively surplus and inexpensive rare earths yttrium and cerium are used to replace Nd and Pr in NdFeB. By controlling the ratio of the rare earth elements such as yttrium, cerium and neodymium, and adding an appropriate amount of Nb and Al elements, the rare earth elements are used in a comprehensive and balanced manner while the crystal grains of the main phase are refined and better magnetic properties are maintained, and thus the production cost of the magnet is greatly reduced.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

DETAILED DESCRIPTION

Figure 1:
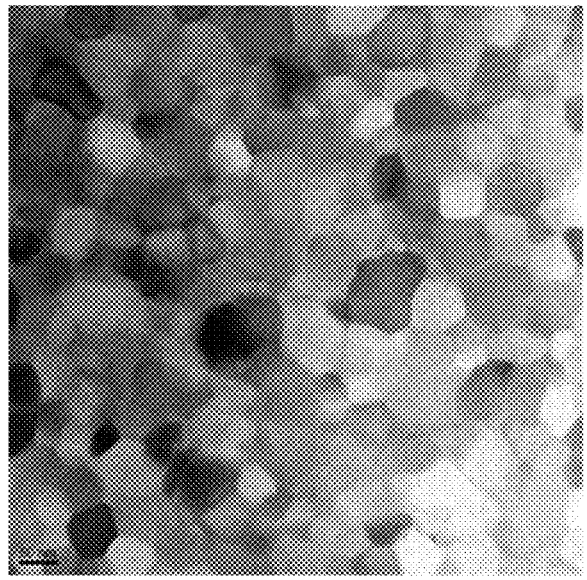
FIG. 1 is a TEM image of a permanent magnet material with an alloy component $(Nd(Pr))_{25}Fe_{bal}M_{1.2}B_{0.8}$ (wt %).

In order for the convenience of understanding the present invention, the embodiments of the present invention are listed as follows. It should be understood by those skilled in the art that the embodiments are merely intended to understand the present invention instead of specific limitation to the present invention.

Embodiment 1

The permanent magnet material prepared in the present embodiment has the following alloy component: the permanent magnet of $(Y_{0.1}(Nd, Pr, Ce)_{0.9})_{27}Fe_{bal}M_{1.45}B_1$ (M is Al and Nb) (wt %), and the specific steps are as follows.

(1) A master alloy with the above alloy component is prepared, wherein the ratio of Nd to Pr to Ce in mass percentage in the raw material is 70:20:10, the phase forms of M and B are respectively iron alloys with the iron contents of 35% and 80%, Y is added in the form of a pure metal, and the remaining amount is blended in the form of pure iron metal. The NdFeB rare earth permanent magnet material is then manufactured with the following process steps.

(2) The prepared raw material is placed in a vacuum arc furnace to be uniformly melted, and the current is turned off until the alloy liquid is cooled to obtain a master alloy ingot. The prepared ingot is placed in a high-vacuum single-roller rotational quenching device, melted at a high temperature, cast onto a rotating roller, and subjected to rotational rapid quenching cooling at a cooling rate of $3*10^5$ K/s, wherein the rapid quenching process is carried out under a protective atmosphere. The molten steel is sprayed onto a roller rotating at a roller speed of 20 m/s to obtain a rapidly quenched thin strip.

(3) Heat treatment is performed on the above rapidly quenched strip, wherein the heat treatment temperature is 750° C., and the heat treatment time is 15 min.

(4) After the above heat treatment, the rapidly quenched strip is subjected to water-cooling quenching for 30 min, and then is crushed into alloy powder having an average particle size of 100 nm by coarse pulverization and grinding.

(5) Epoxy resin in an amount of 1 wt % of the selected magnetic powder is weighed and dissolved in acetone to prepare an epoxy resin acetone solution. The above preferred rapidly quenched magnetic powder is slowly poured into the epoxy resin acetone solution, and stirred until the acetone is completely volatilized, and the mixture is crushed to obtain mixed powder. Zinc stearate (playing a role of surface lubrication, and being favorable for demolding) in an amount of 0.05 wt % of the selected mixed powder is added, uniform mixing is performed to form a blank, and the blank is mechanically pressed into a billet in a specific mold. The billet is placed in an oven for solidification treatment, wherein the heat treatment is thermal insulation at 150° C. for 1 h, so that an yttrium-containing NdFeB-bonded permanent magnet material is obtained.

By testing, the magnetic properties of the magnet are as shown in Table 1.

TABLE 1

Magnetic properties of the yttrium-containing NdFeB-bonded permanent magnet material according to Embodiment 1.

| Component name (wt %) | Br | Hcj | $(BH)_{max}$ | Average crystal phase size | Crystal grain deviation | Magnetic flux loss after thermal demagnetization at 120° C. for 100 h |
|---|---|---|---|---|---|---|
| $(Y_{0.1}(Nd, Pr, Ce)_{0.9})_{27}Fe_{bal}M_{1.45}B_1$ | 6.64 KGs | 12.05 KOe | 9.08 MGOe | 34.65 nm | 8.73 | 1.4% |

Embodiment 2

The permanent magnet material prepared in the present embodiment has the following alloy component: the permanent magnet of $(Y_{0.2}(Nd, Pr, Ce)_{0.8})_{25}Fe_{bal}M_{1.2}B_{0.8}$ (M is Nb) (wt %), and the specific steps are as follows.

(1) A master alloy with the above alloy component is prepared, wherein the ratio of Nd to Pr to Ce in mass percentage in the raw material is 70:20:10, the phase forms of M and B are respectively iron alloys with the iron contents of 35% and 80%, Y is added in the form of a pure metal, and the remaining amount is blended in the form pure iron metal.

(2) The prepared raw material is placed in a vacuum arc furnace to be uniformly melted, and the current is turned off until the alloy liquid is cooled to obtain a master alloy ingot. The prepared ingot is placed in a high-vacuum single-roller rotational quenching device, melted at a high temperature, cast onto a rotating roller, and subjected to rotational rapid quenching cooling at a cooling rate of $8*10^5$ K/s, wherein the rapid quenching process is carried out under a protective atmosphere. The molten steel is sprayed onto a roller rotating at a roller speed of 30 m/s to obtain a rapidly quenched thin strip.

(3) Heat treatment is performed on the above rapidly quenched thin strip, wherein the heat treatment temperature is 700° C., and the heat treatment time is 12 min.

(4) After the above heat treatment, the rapidly quenched strip is subjected to water-cooling quenching for 40 min, and is crushed into alloy powder having an average particle size of 150 nm by coarse pulverization and grinding.

(5) The epoxy resin in an amount of 0.8 wt % of the selected magnetic powder is weighed and dissolved in acetone to prepare an epoxy resin acetone solution. The above preferred rapidly quenched magnetic powder is slowly poured into the epoxy resin acetone solution, and stirred until the acetone is completely volatilized, and the mixture is crushed to obtain mixed powder. The zinc stearate in an amount of 0.05 wt % of the selected mixed powder is added, uniform mixing is performed to form a blank, and the blank is mechanically pressed into a billet in a specific mold. The billet is placed in an oven for solidification treatment, wherein the heat treatment is thermal insulation at 150° C.

for 1 h, so that an yttrium-containing NdFeB-bonded permanent magnet material is obtained.

By testing, the magnetic properties of the magnet are as shown in Table 2.

atmosphere. The molten steel is sprayed onto a roller rotating at a roller speed of 25 m/s to obtain a rapidly quenched thin strip.

TABLE 2

Magnetic properties of the yttrium-containing NdFeB-bonded permanent magnet material according to Embodiment 2.

| Component name (wt %) | Br | Hcj | $(BH)_{max}$ | Average crystal phase size | Crystal grain deviation | Magnetic flux loss after thermal demagnetization at 120° C. for 100 h |
|---|---|---|---|---|---|---|
| $(Y_{0.2}(Nd, Pr, Ce)_{0.8})_{25}Fe_{bal}M_{1.2}B_{0.8}$ | 6.74 KGs | 9.85 KOe | 8.76 MGOe | 38.44 nm | 4.62 | 1.3% |

Figure 2:
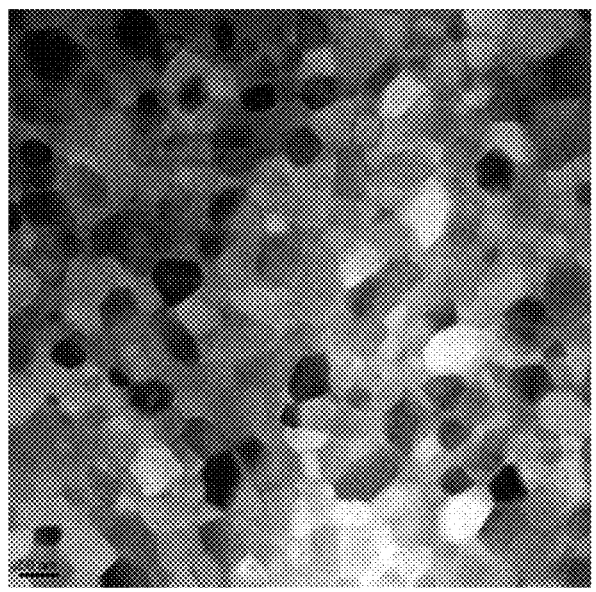
FIG. 2 is a TEM image of an yttrium-containing permanent magnet material with an alloy component $(Y_{0.2}Nd(Pr)_{0.8})_{25}Fe_{bal}M_{1.2}B_{0.8}$ (wt %).

FIG. 1 shows an initial TEM image without yttrium. According to the statistical calculation of the grain size, the average grain size is 85.57 nm and the standard deviation of the grain size is 15.74. FIG. 2 shows a TEM image of the magnet added with yttrium in the present embodiment. According to the statistical calculation of the grain size, the average grain size is 38.44 nm and the standard deviation of the grain size is 4.62.

By comparing the grain sizes of the two TEM images, the crystal grain refinement of the bonded magnet after the addition of yttrium can be seen: after the addition of yttrium, the crystal grains are remarkably refined, and the standard deviation is reduced, indicating that the morphology distribution is more uniform.

Embodiment 3

The permanent magnet material prepared in the present embodiment has the following alloy component: the permanent magnet of $(Y_{0.5}(Nd, Pr, Ce)_{0.5})_{28}Fe_{bal}M_{1.4}B_{1.5}$ (M is Nb) (wt %), and the specific steps are as follows.

(1) A master alloy with the above alloy component is prepared, wherein the ratio of Nd to Pr to Ce in mass percentage in the raw material is 70:20:10, the phase forms of M and B are respectively iron alloys with the iron contents of 35% and 80%, Y is added in the form of a pure metal, and the remaining amount is blended in the form pure iron metal.

(2) The prepared raw material is placed in a vacuum arc furnace to be uniformly melted, and the current is turned off until the alloy liquid is cooled to obtain a master alloy ingot. The prepared ingot is placed in a high-vacuum single-roller rotational quenching device, melted at a high temperature, cast onto a rotating roller, and subjected to rotational rapid quenching cooling at a cooling rate of $4*10^5 K/s$, wherein the rapid quenching process is carried out under a protective (3) Heat treatment is performed on the above rapidly quenched thin strip, wherein the heat treatment temperature is 730° C., and the heat treatment time is 13 min.

(4) After the above heat treatment, the rapidly quenched strip is subjected to water-cooling quenching for 50 min, and is crushed into alloy powder having an average particle size of 200 nm by coarse pulverization and grinding.

(5) The epoxy resin in an amount of 1.2 wt % of the selected magnetic powder is weighed and dissolved in acetone to prepare an epoxy resin acetone solution. The above preferred rapidly quenched magnetic powder is slowly poured into the epoxy resin acetone solution, and stirred until the acetone is completely volatilized, and the mixture is crushed to obtain mixed powder. The zinc stearate in an amount of 0.05 wt % of the selected mixed powder is added, uniform mixing is performed to form a blank, and the blank is mechanically pressed into a billet in a specific mold. The billet is placed in an oven for solidification treatment, wherein the heat treatment is thermal insulation at 150° C. for 1 h, so that an yttrium-containing NdFeB-bonded permanent magnet material is obtained.

By testing, the magnetic properties of the magnet are as shown in Table 3.

TABLE 3

Magnetic properties of the yttrium-containing NdFeB-bonded permanent magnet material according to Embodiment 3.

| Component name (wt %) | Br | Hcj | $(BH)_{max}$ | Average crystal phase size | Crystal grain deviation | Magnetic flux loss after thermal demagnetization at 120° C. for 100 h |
|---|---|---|---|---|---|---|
| $(Y_{0.5}(Nd, Pr, Ce)_{0.5})_{28}Fe_{bal}M_{1.4}B_{1.5}$ | 6.55 KGs | 10.84 KOe | 8.30 MGOe | 43.40 nm | 6.45 | 1.2% |

Embodiments 4-6

The operation is performed according to the steps of Embodiment 1, except that the component and operation conditions are as shown in Table 4 below, and by testing, the results of the magnetic properties of the obtained products are shown in Table 5.

TABLE 4

Components and preparation conditions of the permanent
magnet materials according to Embodiments 4-6

| | Component name (wt %) | Mass ratio of Nd to Pr to Ce |
|---|---|---|
| Embodiment 4 | $(Y_{0.05}(Nd, Pr, Ce)_{0.95})_{20}Fe_{bal}Al_{0.5}B_{0.5}$ | 60:20:20 |
| Embodiment 5 | $(Y_{0.3}(Nd, Pr, Ce)_{0.7})_{26}Fe_{bal}Al_2B_{1.5}$ | 75:20:5 |
| Embodiment 6 | $(Y_{0.3}(Nd, Pr, Ce)_{0.7})_{23}Fe_{bal}Nb_{1.2}B_{0.8}$ | 65:20:15 |

Following table 4

| | Cooling rate of rotational rapid quenching cooling (° C./s) | Rotational quenching roller speed (m/s) | Heat treatment condition (° C., min) | Quenching time (min) | Average particle size of alloy powder (nm) | Addition amount of epoxy resin (wt %) |
|---|---|---|---|---|---|---|
| Embodiment 4 | $2*10^5$ | 15 | 800, 5 | 60 | 150 | 0.5 |
| Embodiment 5 | $10^6$ | 30 | 600, 10 | 50 | 100 | 1 |
| Embodiment 6 | $5*10^5$ | 45 | 700, 15 | 35 | 200 | 2 |

TABLE 5

Magnetic properties of the yttrium-containing NdFeB-bonded
permanent magnet materials according to Embodiments 4-6

| | Br/KGs | Hcj/KOe | (BH)max/MGOe | Average crystal phase size/nm | Crystal grain deviation | Magnetic flux loss after thermal demagnetization at 120° C. for 100 h |
|---|---|---|---|---|---|---|
| Embodiment 4 | 6.98 | 10.65 | 8.73 | 44.78 | 4.56 | 1.5% |
| Embodiment 5 | 6.54 | 10.76 | 8.21 | 36.64 | 12.67 | 1.9% |
| Embodiment 6 | 6.62 | 11.40 | 8.39 | 40.36 | 7.44 | 1.8% |

It can be seen from the above embodiments that the above embodiments according to the present invention achieve the following technical effects: the rare earth permanent magnet material prepared by changing the use amounts of Nd(Pr, Ce), Fe and B, and further combining the Y and Ce elements with the conventional Nd(Pr)FeB rare earth permanent magnet material has an average grain size of 30-45 nm and the minimum standard deviation of 4.62. When the rare earth permanent magnet material of the present invention is compared with the initial NdFeB of which the average grain size of the crystal phase is 80-120 nm, and the standard deviation is 14-20, the crystal grains are obviously refined, and the morphology distribution is more uniform; and while good magnetic properties are maintained, the temperature coefficient is lower and the temperature resistance is better. Since the relatively-abundant light rare earth elements Y and Ce are used to replace Nd and Pr, the production cost is also greatly reduced.

Comparative Example 1

Comparative example 1 is the same as Embodiment 1 except that the mass ratio of Nd to Pr to Ce is 60:10:30, and the content of Ce in mass percentage exceeds 20%.

Comparative Example 2

Comparative example 2 is the same as Embodiment 1 except that the component is $(Y_{0.1}(Nd, Pr, Ce)_{0.9})_{32}Fe_{bal}M_{1.45}B_1$.

Comparative Example 3

Comparative example 3 is the same as Embodiment 1 except that the component is $(Y_{0.1}(Nd, Pr, Ce)_{0.9})_{20}Fe_{bal}M_{1.45}B_1$.

Comparative Example 4

Comparative example 4 is the same as Embodiment 1 except that the rotational rapid quenching cooling rate is $10^{4}$° C./s.

Comparative Example 5

Comparative example 5 is the same as Embodiment 1 except that the rotational rapid quenching cooling rate is $10^{7}$° C./s.

Comparative Example 6

Comparative example 6 is the same as Embodiment 1 except that the rotational quenching roller speed is 10 m/s.

Comparative Example 7

Comparative example 7 is the same as Embodiment 1 except that the rotational quenching roller speed is 55 m/s.

Comparative Example 8

Comparative example 8 is the same as Embodiment 1 except that the heat treatment temperature is 500° C. and the heat treatment time is 25 min.

Comparative Example 9

Comparative example 9 is the same as Embodiment 1, except that the heat treatment temperature is 900° C. and the heat treatment time is 3 min.

Comparative Example 10

Comparative example 10 is the same as Embodiment 1 except that the quenching time is 20 min.

Comparative Example 11

Comparative example 11 is the same as Embodiment 1 except that the quenching time is 80 min.

Comparative Example 12

Comparative example is the same as Embodiment except that the average particle size of the alloy powder is 50 nm.

Comparative Example 14

Comparative example 14 is the same as Embodiment 1 except that the average particle size of alloy powder is 300 nm.

Comparative Example 15

Comparative example 15 is the same as Embodiment 1 except that the addition amount of the epoxy resin is 0.3 wt %.

Comparative Example 16

Comparative example 16 is the same as Embodiment 1, except that the addition amount of the epoxy resin is 3 wt %.

The test results of magnetic properties of the permanent magnet materials prepared in Comparative examples 1-16 are shown in Table 6 below.

TABLE 6

Magnetic properties of yttrium-containing NdFeB-bonded permanent magnet materials of Comparative examples 1-16.

| | Br/KGs | Hcj/KOe | (BH)max ZMGOe | Average crystal phase size/nm | Crystal grain deviation | Magnetic flux loss after thermal demagnetization at 120° C. for 100 h |
|---|---|---|---|---|---|---|
| Comparative example 1 | 5.78 | 7.84 | 6.10 | 52.07 | 50.09 | 2.1% |
| Comparative example 2 | 5.82 | 7.96 | 6.45 | 62.88 | 48.16 | 2.3% |
| Comparative example 3 | 4.37 | 7.22 | 6.62 | 54.68 | 50.31 | 2.5% |
| Comparative example 4 | 4.68 | 7.84 | 6.76 | 48.89 | 51.37 | 2.5% |
| Comparative example 5 | 4.73 | 7.96 | 6.58 | 52.24 | 51.16 | 2.3% |
| Comparative example 6 | 4.67 | 7.22 | 6.23 | 54.71 | 50.40 | 2.5% |
| Comparative example 7 | 4.73 | 7.84 | 6.47 | 52.15 | 56.12 | 2.8% |
| Comparative example 8 | 4.95 | 7.96 | 6.40 | 55.27 | 53.17 | 2.4% |
| Comparative example 9 | 5.16 | 7.22 | 6.23 | 69.87 | 48.23 | 2.2% |
| Comparative example 10 | 4.63 | 7.84 | 6.40 | 50.42 | 50.30 | 2.7% |
| Comparative example 11 | 4.80 | 7.96 | 6.45 | 74.12 | 50.31 | 2.5% |
| Comparative example 12 | 4.96 | 7.2 | 6.59 | 60.25 | 50.23 | 2.6% |
| Comparative example 13 | 5.08 | 7.84 | 6.24 | 57.23 | 48.12 | 2.4% |
| Comparative example 14 | 4.98 | 7.96 | 6.44 | 67.25 | 51.15 | 2.6% |
| Comparative example 15 | 5.42 | 7.22 | 6.32 | 54.68 | 49.30 | 2.4% |
| Comparative example 16 | 5.29 | 7.22 | 6.68 | 49.23 | 48.78 | 2.3% |

By comparing the product performance data of the comparative examples in Table 6 with the performance data of the embodiments, it can be seen that if the raw material component or content, the particle size, and the preparation process parameters are not within the scope of the present invention, the comprehensive magnetic properties of the prepared permanent magnet material are significantly reduced.

It is apparent that the above embodiments are merely intended for clear description, instead of limiting the implementations. Other variations or modifications of the various forms may also be made by those skilled in the art based on the above description. There is no need and no way to exhaust all of the embodiments, and obvious changes or variations resulting therefrom are still within the protection scope of the present invention.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A yttrium-added rare earth permanent magnet material, wherein the chemical formula of the material is expressed as $(Y_xRe_{1-x})_aFe_{100-a-b-c}M_bB_c$ according to the mass percentage, where $0.05 \leq x \leq 0.5$, $20 \leq a \leq 28$, $0.5 \leq b \leq 2$, $0.5 \leq c \leq 1.5$, Re is Nd, Pr and Ce, or Re is Nd and Ce, or Re is Pr and Ce, and the mass content of Ce in Re is 0-20%, excluding 0, and M is Al and/or Nb, and the average grain size of the material is 30 nm-45 nm, and the standard deviation is 4-9.

2. The material according to claim 1, wherein the material has a single 2:14:1 phase structure and the proportion of yttrium in the main phase is 100%.

3. The material according to claim 2, wherein the ratio of Y:Ce is 1-2.

4. The material according to claim 1, wherein the ratio of Y:Ce is 1-2.

5. A method for preparing the yttrium-added rare earth permanent magnet material according to claim 1, comprising the steps of:
   (1) preparing a raw material according to the composition of the permanent magnet material according to claim 1, then melting and refining the raw material into an ingot, melting the ingot at a high temperature and then casting the melted ingot onto a rotating roller, and performing rotational rapid quenching and cooling to obtain a rapidly quenched thin strip;
   (2) performing heat treatment on the thin strip obtained in step (1), then quenching the thin strip and pulverizing the quenched thin strip into alloy powder; and
   (3) bonding the alloy powder obtained in step (2) with a binder to obtain the permanent magnet material;
   wherein the high temperature is 100-300° C. above a melting point of the raw material for preparing the rapidly quenched thin strip; and
   the casting is carried out by a vacuum single-roller rotational quenching method, and a speed of the single-roller rotational quenching is 15-45 m/s, and a cooling rate of the rotational rapid quenching and cooling is $10^5$-$10^6$° C./s.

6. The method according to claim 5, wherein the melting in step (1) is vacuum melting.

7. The method according to claim 5, wherein in step (2), the heat treatment temperature is 600-800° C., and the heat treatment time is 5-15 min; and
   the quenching is water-cooling quenching; and
   the quenching time is 30-60 min; and
   the average particle size of the alloy powder is 100 nm-200 nm.

8. The method according to claim 5, wherein in step (3), the binder is epoxy resin;
   wherein a use amount of the binder is 0.5-2 wt % of the alloy powder; and
   the bonding process comprises: mixing the alloy powder with an organic solvent in which the binder is dissolved, and then volatilizing the solvent to obtain the permanent magnet material; and
   the organic solvent is one or a combination of two or more of ethanol, toluene, xylene and acetone.

* * * * *